Dec. 18, 1956　　　M. W. BOWERSOX　　　2,774,581
EVAPORATIVE COOLER
Filed Oct. 25, 1954　　　　　　　　　　　2 Sheets-Sheet 1
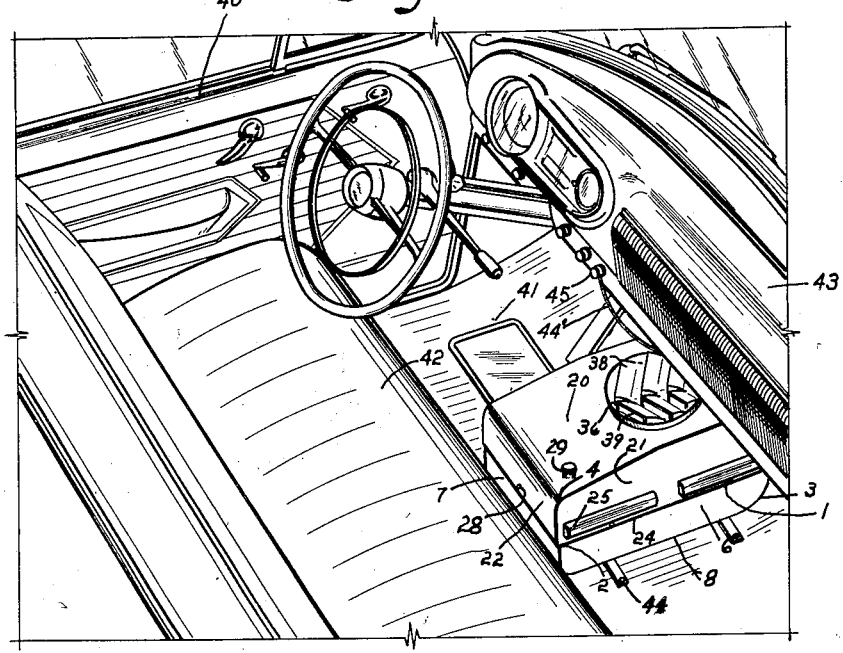
INVENTOR.
Marvin W. Bowersox.
BY
Frishburn & Mullendore
ATTORNEYS.

Dec. 18, 1956 M. W. BOWERSOX 2,774,581
EVAPORATIVE COOLER
Filed Oct. 25, 1954 2 Sheets-Sheet 2
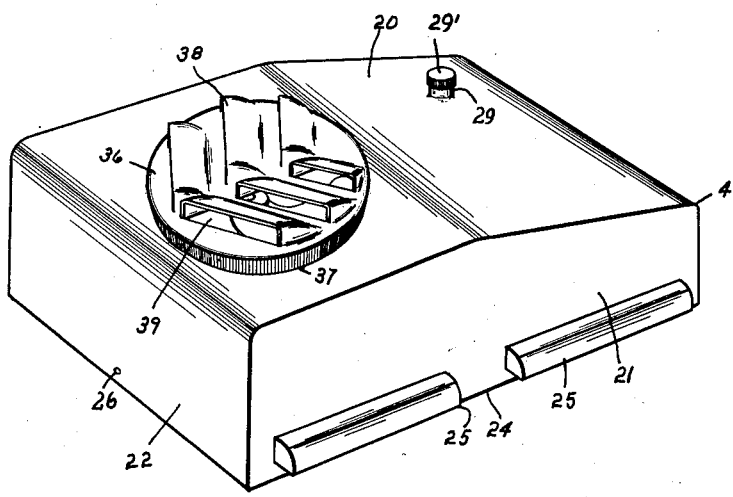
Fig. 4.
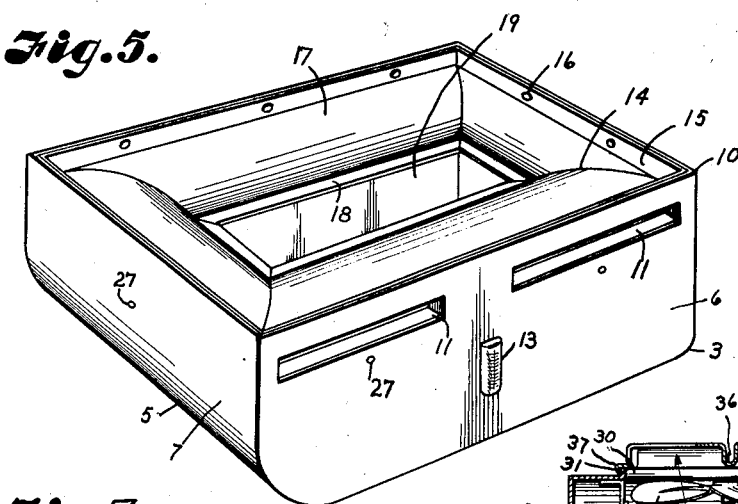
Fig. 5.
Fig. 6.
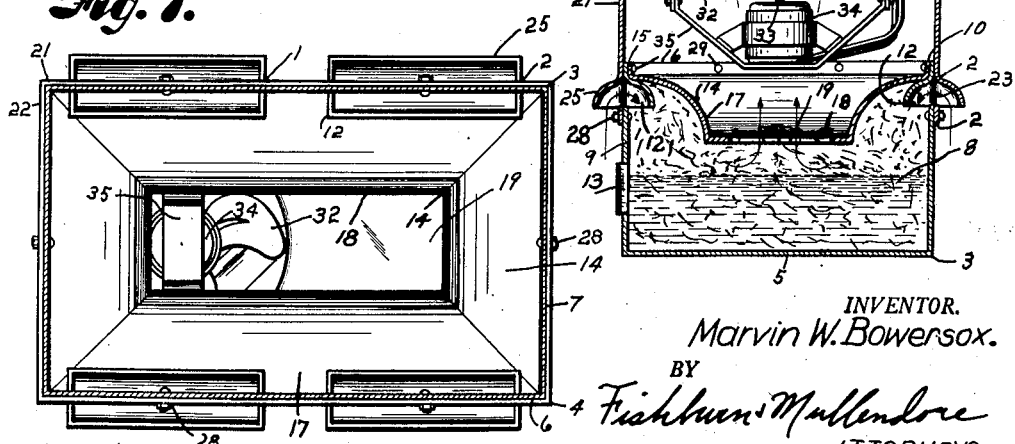
Fig. 7.
INVENTOR.
Marvin W. Bowersox.
BY
Fishburn & Mullendore
ATTORNEYS.

United States Patent Office 2,774,581
Patented Dec. 18, 1956

2,774,581

EVAPORATIVE COOLER

Marvin W. Bowersox, Elk City, Kans.

Application October 25, 1954, Serial No. 464,361

2 Claims. (Cl. 261—24)

This invention relates to evaporative coolers wherein contact of air and water or like liquid results in evaporation of the liquid and cooling of the air, and more particularly to such a device adapted for use in vehicles such as passenger automobiles.

The objects of the present invention are to provide a self-contained unit that will rest on the floor of an automobile or other suitable support and circulate air in the passenger compartment; to provide such a unit having a housing with a blower structure in the upper portion and a humidifier unit in the bottom portion with openings and baffles for directing the movement of air through the humidifier unit; to provide such a cooler with a liquid sump with baffles thereabove and fibrous material in the sump and extending above the liquid level to the baffles and wetted by capillary action whereby air moving through the cooler will pass in contact with the wetted fibrous material between the liquid and baffles and be cooled by the evaporation of liquid therein; and to provide an evaporative cooler that is self-contained; economical to manufacture and easily installed, and operated to efficiently cool and circulate air in compartments to be cooled.

In accomplishing these and other objects of the present invention I have provided improved details of structure, the preferred forms of which are illustrated in the accompanying drawings, wherein:

Fig. 1 is a perspective view of a portion of an automobile with a cooler embodying the features of the present invention located therein.

Fig. 2 is a plan view of the evaporative cooler.

Fig. 3 is a side elevation of the evaporative cooler.

Fig. 4 is a perspective view of the upper portion of the housing.

Fig. 5 is a perspective view of the lower portion of the housing with the upper portion removed therefrom.

Fig. 6 is a transverse sectional view through the cooler.

Fig. 7 is a horizontal sectional view through the cooler.

Referring more in detail to the drawings:

1 designates an evaporative cooler particularly adapted to be arranged on the floor or other support in the passenger compartment of an automobile or like vehicle for circulating and cooling the air therein. The evaporative cooler 1 includes a housing 2 preferably formed to provide a bottom portion 3 and an upper portion 4, each of which is of suitable size and contour whereby the housing may be conveniently arranged on the floor of an automobile between the front seat and dash thereof.

The bottom portion 3 of the housing preferably has a bottom wall 5, side walls 6 and end walls 7 suitably shaped and secured together to form a sump 8 of suitable size and shape to contain a quantity of liquid, such as water, and a fibrous material 9 as a suitable type adapted to be wetted through capillary action by the liquid. The side walls 6 and end walls 7 extend upwardly from the bottom 5 and terminate as at 10 substantially above the desired depth of water in the sump. Each of the side walls 6 is provided with elongated openings 11 extending longitudinally of the side walls to form air inlet openings arranged between the uppermost desired water level and the upper edges of the walls 6. The openings 11 are preferably stamped or otherwise suitably formed in the side wall 6 to provide inwardly directed louvers 12. An opening covered by suitable transparent material 13 is arranged in one of the walls to provide a window for inspection of the liquid level in the cooler 1.

A baffle member 14 is arranged in the bottom portion 3 of the housing, said baffle portion having a flange 15 which engages the inner surface of the side walls 6 and end walls 7 between the louvers 12 and the upper edge 10 of said walls, the flange 15 being secured to said walls by suitable fastening devices, such as rivets 16. The baffle member 14 includes walls 17 which curve inwardly and downwardly from the flange 15 and terminate in inwardly turned flanges 18 below the bottom edge of the openings 11, the inner ends of the flanges 18 defining an opening 19 centrally arranged relative to the walls of the bottom portion 3 of the housing. The walls 17 cooperate with the walls of the bottom portion of the housing to confine the excelsior or other fibrous material 9 therein, as illustrated in Fig. 6.

The upper portion 4 of the housing includes a top wall 20, depending side walls 21 and end walls 22, suitably shaped and secured together to form a cover for the bottom portion 3 of the housing with the side and end walls 21 and 22 sleeved over the side and end walls 6 and 7 respectively. The side walls 21 are provided with spaced elongated openings 23 adjacent the lower edges 24 of said side walls and in position to register with the openings 11 in the side wall 6 when the upper portion is assembled on the bottom portion of the housing. The openings 23 are preferably stamped or otherwise suitably formed in the side walls 21 to provide outwardly directed louvers 25. The side and end walls of the upper section have openings 26 which register with openings 27 in the side and end walls of the bottom portion of the housing, said openings receiving fastening devices 28 which secure the upper portion onto the bottom portion of the housing. A fill opening 29 is arranged in the cooler preferably in the top wall 20 thereof and may be closed by a suitable removable cap 29'. The top wall 20 also is provided with a circular opening 30 defined by an upstanding peripheral flange 31, said opening 30 being for discharge of air from the housing.

A fan blade 32 is fixed on a motor shaft 33 of a motor 34 and arranged in the upper portion of the housing immediately below the opening 30. The motor 34 is secured to mounting brackets 35 which are suitably connected to the top wall 20. A cover member 36 is arranged over the opening 30 and has depending flanges 37 slidably engaging the upstanding flange 31. It is preferable that the flange 31 slope outwardly and the flange 37 slope inwardly whereby the cooperative engagement of the respective flanges retains the cover 30 in rotatable engagement with the flange 31. Air directing louvers 38 are stamped or otherwise suitably formed in the cover 36 and arranged relative to air discharge openings 39 therein whereby rotation of the cover 36 will adjust the direction of the air discharged from the housing.

In using an evaporative cooler constructed and assembled as described for cooling the interior of automobiles 40 and the like, said cooler 1 is arranged on a suitable support in said automobile as, for example, placing the bottom wall 5 on the floor 41 between the front seat 42 and dash 43. Brackets 44 preferably mounted on the bottom 5 of the cooler and suitably secured to the floor 41 to hold the cooler in place. Water is then delivered to the interior of the housing through the opening 29 until the water is at a suitable level below the flanges 18 whereby air may pass between the water level and the baffle. The water being in contact with the fibrous material wets the remainder of said material through capillary action. The motor 34 is then connected by a suitable conductor 44' to a source of electric current, for example in the cigar lighter socket 45, to energize the motor and rotate the fan 32. Operation of the fan induces a flow of air through the louvered openings, downwardly through the wetted fibrous material, then upwardly through the opening 19 between the baffles 17 and then outwardly through the opening 30 and louvers 38 into the passenger compartment of the automobile.

Continued operation of the motor and fan continues circulation of the air in the automobile and through the cooler 1. The air as it passes through the wetted fibrous material effects the evaporation of water therein, which evaporation cools the air that is returned to the passenger compartment. As water is evaporated from the wetted fibrous material additional water is drawn upwardly in said material to maintain same wet.

It is believed obvious I have provided a simple, efficient evaporative cooler structure which is economical to manufacture and easily installed and maintained.

What I claim and desire to secure by Letters Patent is:

1. An evaporative cooler comprising, a housing having bottom, side, end and top walls, said housing being adapted to contain evaporative liquid in the lower portion thereof, a baffle secured to the side and end walls intermediate the bottom and top walls and curving inwardly and downwardly from said side and end walls and terminating in an inwardly turned substantially continuous flange having spaced relation to the evaporative liquid level in the housing, said inwardly turned flange defining a central opening through the baffle, fibrous material in the housing between the baffle and bottom wall and extending into the evaporative liquid in the housing, louvers in the side walls adjacent to and below the portion of the baffle secured to the side walls for entry of air into the housing, said housing having an opening in a selected wall for introducing evaporative liquid into the portion containing the fibrous material, said housing having an air discharge opening in the upper portion thereof above the baffle, and a motor driven fan in the upper portion of the housing and aligned with the air discharge opening whereby operation of the fan draws air through the louvers and wetted fibrous material between the baffle and evaporative liquid level to cool the air by evaporation of said liquid and then through the opening in the baffle and discharges the cooled air through the air discharge opening.

2. An evaporative cooler comprising, a lower housing section having bottom, side and end walls defining an evaporative liquid receiving compartment, a baffle having an upper portion secured to the side and end walls of the lower housing adjacent the upper edges thereof, said baffle being continuous around the interior of said housing side and end walls and curving inwardly and downwardly therefrom and terminating in an inwardly turned flange having spaced relation to the bottom wall, said inwardly turned flange baffle defining a central opening therethrough, fibrous material substantially filling the evaporative liquid receiving compartment between the baffle, bottom, side and end walls of the lower housing section, elongate louvers in the side walls adjacent to and below the baffle for entry of air into the evaporative liquid receiving compartment, an upper housing section having a top wall and depending side and end walls with said side and end walls thereof adapted to engage the respective side and end walls of the lower housing section, means removably securing the upper housing section to the lower housing section in covering relation thereto, said upper housing section having an air discharge opening in the top wall thereof, a motor driven fan in the upper housing section and aligned with the air discharge opening whereby operation of the fan draws air through the louvers and wetted fibrous material in the evaporative liquid receiving compartment to cool said air by evaporation of said liquid and then through the opening in the baffle and discharges the cooled air through the air discharge opening, and a cover rotatably mounted on the upper housing section over the discharge opening and having air directing louvers therein for deflecting the discharged air in the direction desired.

References Cited in the file of this patent

UNITED STATES PATENTS

| | | |
|---|---|---|
| 2,562,589 | Uttz | July 31, 1951 |
| 2,600,926 | Rudd | June 17, 1952 |
| 2,631,830 | Carraway | Mar. 17, 1953 |
| 2,668,038 | Dry | Feb. 2, 1954 |